(12) United States Patent
Smith et al.

(10) Patent No.: US 6,973,659 B2
(45) Date of Patent: Dec. 6, 2005

(54) MAPPING BETWEEN REMOTE PROCEDURE CALL SYSTEM PRIMITIVES AND EVENT DRIVEN EXECUTION ENVIRONMENT SYSTEM PRIMITIVES

(75) Inventors: Eishy Smith, Hamovil (IL); Gal Shachor, Yokneam (IL); Pnina Vortman, Haifa (IL); Tirtsa Hochberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/226,562

(22) Filed: Aug. 22, 2002

(65) Prior Publication Data

US 2004/0040033 A1 Feb. 26, 2004

(51) Int. Cl.[7] ................................................. G06F 9/44
(52) U.S. Cl. ...................... 719/330; 719/315; 719/316; 719/318; 709/203; 709/219
(58) Field of Search ........................ 719/330, 315–318; 709/200–203, 217–219

(56) References Cited

U.S. PATENT DOCUMENTS

| | | | | |
|---|---|---|---|---|
| 5,991,802 A | * | 11/1999 | Allard et al. ................ 709/219 |
| 6,052,710 A | * | 4/2000 | Saliba et al. ................ 709/203 |
| 6,370,561 B1 | * | 4/2002 | Allard et al. ................ 709/203 |
| 6,782,542 B1 | * | 8/2004 | Mein et al. .................. 719/330 |
| 2002/0046239 A1 | * | 4/2002 | Stawikowski et al. ...... 709/203 |
| 2003/0200349 A1 | * | 10/2003 | Hansen ........................ 709/315 |

OTHER PUBLICATIONS

Simple Objects Access Protocol (SOAP) 1.1, W3C Note May 8, 2000, http://www.w3.org/TR/2000/NOTE-SOAP-20000508.*

* cited by examiner

*Primary Examiner*—St. John Courtenay, III
(74) *Attorney, Agent, or Firm*—Stephen C. Kaufman

(57) ABSTRACT

A method for facilitating execution of a remote method, that is originated from a Remote Procedure Call system, in an Event Driven Execution Environment system, including receiving from a Remote Procedure Call system a message expressed in Remote Procedure Call system primitives. Mapping Remote Procedure Call system primitives of the message to Event Driven Execution Environment system primitives. Transmitting primitives of the mapped message to the Event Driven Execution Environment system for execution. Receiving a result of the execution from the Event Driven Execution Environment system, and transmitting the result to the Remote Procedure Call system.

9 Claims, 2 Drawing Sheets

MAPPING BETWEEN REMOTE PROCEDURE CALL SYSTEM PRIMITIVES AND EVENT DRIVEN EXECUTION ENVIRONMENT SYSTEM PRIMITIVES

FIELD OF THE INVENTION

The present invention relates to a system and method for invoking procedures in remote nodes, using e.g. Simple Object Access Protocol (SOAP) and Service Logic Execution Environment (SLEE).

BACKGROUND OF THE INVENTION

SOAP (Simple Object Access Protocol) is a lightweight protocol for exchange of information in a decentralized, distributed environment. It is an XML-based protocol that consists of three parts: an envelope that defines a framework for describing what is in a message and how to process it, a set of encoding rules for expressing instances of application-defined data types, and a convention for representing remote procedure calls (also referred to as remote methods) and results. SOAP can potentially be used in combination with a variety of other protocols, however, the only bindings defined in the current spec (1.1) describe how to use SOAP in combination with HTTP and HTTP Extension Framework.

The SOAP facilitates sending a request from one computer to an application on another computer (and possibly a completely different platform), instructing that application to do something. There are several ways of doing this, but the XML/HTTP combination is far more Internet-friendly, and many believe that this is one of the advantages of SOAP. The SOAP is applicable in many applications, including, e.g. business-to-business integration (B2Bi).

SLEE (Service Logic Execution Environment) is a run time environment in which a service executes. Services inside the SLEE communicate through events that are thrown inside the SLEE. Any request for a task from a service from outside or inside the SLEE is dispatched within an event. This product provides a well defined, open interface for the handling of call control threads, call context data and application management. It also provides efficient flexible mechanisms for multiple interfaces to communicate events with the call, thereby simplifying the service logic interfaces.

SLEE is similar in concept to a major road intersection, where routes carrying traffic come together and traffic is safely and efficiently managed through the intersection by some "management intelligence" such as traffic lights. The net result is a smooth flow of traffic being directed to the correct route in such a manner that no damage is caused and no traffic lost.

SUMMARY OF THE INVENTION

The invention provides for a method for facilitating execution of a remote method, that is originated from a Remote Procedure Call system, in an Event Driven Execution Environment system, comprising:

receiving from a Remote Procedure Call system a message expressed in Remote Procedure Call system primitives;

mapping Remote Procedure Call system primitives of the message to Event Driven Execution Environment system primitives;

transmitting primitives of the mapped message to the Event Driven Execution Environment system for execution;

receiving a result of the execution from the Event Driven Execution Environment system;

transmitting the result to the Remote Procedure Call system.

The invention further provides for a method for execution of a remote method, that is originated from a Simple Object Access Protocol (SOAP) system, in a Service Logic Execution Environment (SLEE) system, comprising:

invoking a computer code portion for applying a method with method parameters on the class instant to give rise to a result; the class, method and method parameters form part of SOAP primitives;

transmitting SOAP message that includes the SOAP primitives through the WEB;

receiving and mapping SOAP primitives in the message to SLEE primitives, including:

mapping a class to a service;

generating a service instance;

mapping a method to an event;

mapping method parameters to event parameters;

firing the event for processing by the service instant that is executed in the SLEE;

executing a logic associated with the service instant using the event parameters and delivering a result;

inserting the result into the event such that the result is ready to be read from the event.

transmitting the result as a reply to the SOAP message; and extracting the result from the SOAP message.

Still further, the invention provides for an apparatus for facilitating execution of a remote method, that is originated from a Remote Procedure Call system, in an Event Driven Execution Environment system, comprising:

a processor and a first link interface configured to receive from a Remote Procedure Call system a message expressed in Remote Procedure Call system primitives;

the processor and associated database are configured to map the message to Event Driven Execution Environment system primitives;

the processor and a second link interface configured to transmit primitives of the mapped message to the Event Driven Execution Environment system for execution;

the processor and the second link interface are configured to receive a result of the execution from the Event Driven Execution Environment system;

the processor and the first link are configured to transmit the result to the Remote Procedure Call system.

Yet further, the invention provides for a program storage device readable by machine, tangibly embodying a program of instructions executable by the machine to perform method steps for facilitating execution of a remote method, that is originated from a Remote Procedure Call system, in an Event Driven Execution Environment system, comprising:

receiving from a Remote Procedure Call system a message expressed in Remote Procedure Call system primitives;

mapping Remote Procedure Call system primitives of the message to Event Driven Execution Environment system primitives;

transmitting primitives of the mapped message to the Event Driven Execution Environment system for execution;

receiving a result of the execution from the Event Driven Execution Environment system;

transmitting the result to the Remote Procedure Call system.

The invention provides for a computer program product comprising a computer useable medium having computer readable program code embodied therein for facilitating execution of a computer program product, comprising:

computer readable program code for causing the computer to receive from a Remote Procedure Call system a message expressed in Remote Procedure Call system primitives;

computer readable program code for causing the computer to mapping Remote Procedure Call system primitives of the message to Event Driven Execution Environment system primitives;

computer readable program code for causing the computer to transmitting primitives of the mapped message to the Event Driven Execution Environment system for execution;

computer readable program code for causing the computer to receiving a result of the execution from the Event Driven Execution Environment system;

computer readable program code for causing the computer to transmit the result to the Remote Procedure Call system.

BRIEF DESCRIPTION OF THE DRAWINGS

In order to understand the invention and to see how it may be carried out in practice, a preferred embodiment will now be described, by way of non-limiting examples only, with reference to the accompanying drawings, in which.

DETAILED DESCRIPTION OF THE INVENTION

Currently the SLEE spec enables only Call Control events (via JCC—standing for JAIN Call Control) and transactional events that do not yet have an abstraction layer. Thus, there is a problem to invoke SLEE services from events that are generated by data oriented applications and services, e.g. using the SOAP over the WEB.

Note that, for simplicity, the invention is described in connection with a specific embodiment using SOAP and SLEE. Those versed in the art will readily appreciate that the invention is, by no means, bound by this example. Thus, SOAP is only one example of Remote Procedure Call system and SLEE is only one example of Event Driven Execution Environment system.

Figure 1:
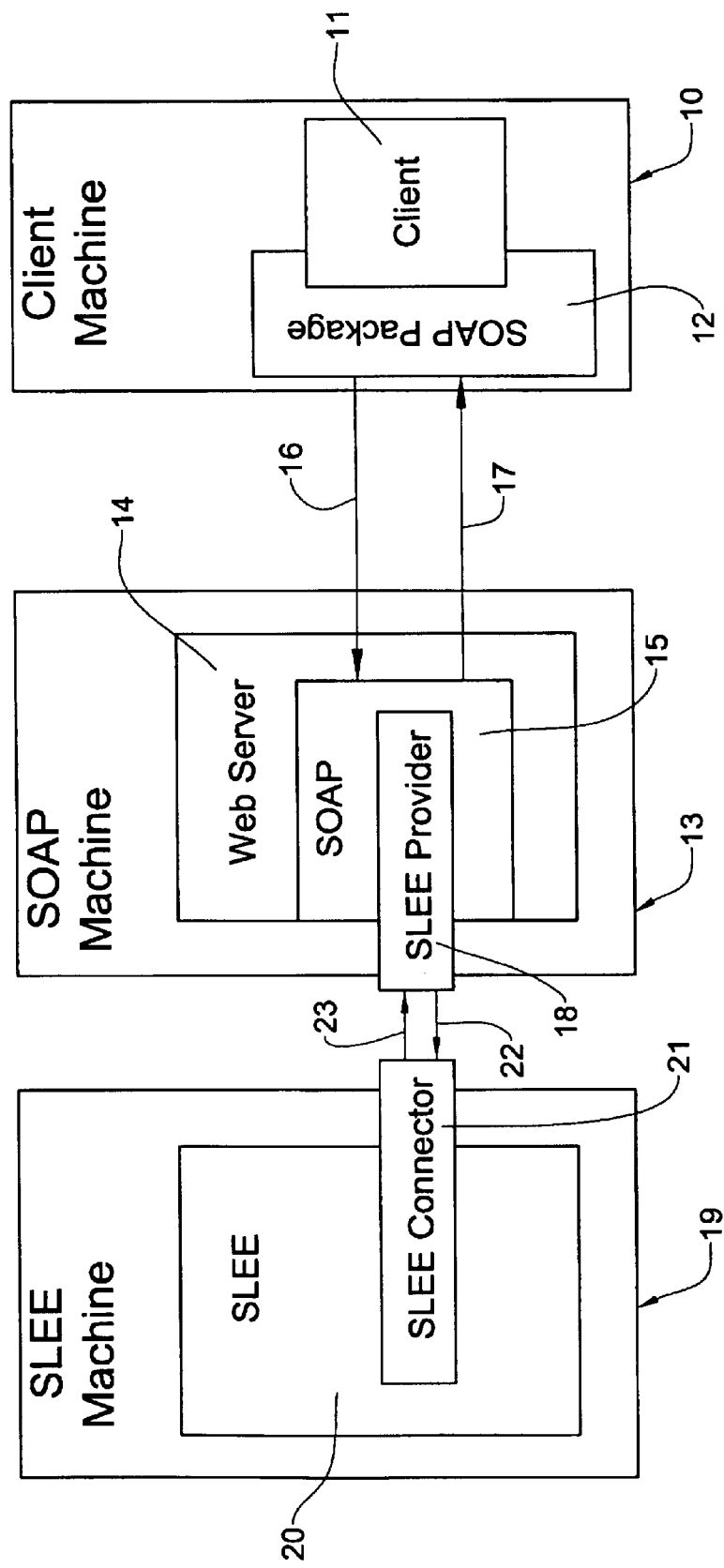
FIG. 1 illustrates a system architecture in accordance with an embodiment of the invention.

Attention is first drawn to FIG. 1, illustrating a general system architecture, in accordance with an embodiment of the invention. This implementation has two basic modules. By this specific embodiment, a client node—also referred to as Simple Object Access Protocol (SOAP) system—(e.g. a PC) (10) employs a client application (11) and a SOAP package (12) that communicates, over a communication medium (say, the Internet), with remote SOAP node (13) (e.g. a WEB server (14) employing a SOAP engine (15).

SOAP package (12) communicates with the SOAP engine (15) though link interface over a communication medium (say the WEB—designated schematically as 16 and 17). The SOAP engine (15) uses a SLEE provider (18). The SOAP node (13) communicates locally or remotely through link interface with SLEE node (19) employing SLEE engine (20) that uses a SLEE connector (21).

The SLEE Connector (21) that is plugged into the SLEE engine (20) uses its dispatch services to launch events to the SLEE engine (20).

By this embodiment The SOAP module (13) and the SLEE module (19) communicate via IP sockets. In the specific embodiment of FIG. 1, the client node (10) is a non-limiting example of Remote procedure call system and the SLEE node (18) is a non-limiting example of Event driven execution environment system. The implementation of any of the nodes is not bound to any particular architecture. Thus, for example, each node may constitute a stand-alone station, say PC, or by another non-limiting embodiment a network of stations, parallel processors, etc. The term processor used herein should be construed as any means for processing either single processor, two or more processors communicating one with the other, etc. For example the SOAP engine, WEB server and SLEE provider of SOAP machine (13) may be three different tasks executed on the processor of SOAP machine (13).

The operation of the client node and the manner in which it communicates with a SOAP machine is generally known per se and therefore will not be expounded upon herein. Thus, in operation, the client application (11) invokes a procedure, which is to be executed in a remote site (referred to also as a remote method). Note that the invention is not bound by any specific method and the latter may perform any task or tasks, depending upon the particular application.

Reverting now to FIG. 1, and as will be exemplified below, the SOAP package (12) generates a SOAP message (that includes identification of the remote procedure) that is transmitted to the remote SOAP server (13), using the known per se SOAP protocol. Note that the remote procedure will not be executed in the remote SOAP server (14) but rather, in accordance with the proposed technique of an embodiment of the invention, it will be executed as a service in the SLEE node. Those versed in the art will readily appreciate that this is only an example. Thus by another embodiment certain logic may be employed to decide what tasks will executed at the SOAP server and what at the SLEE node.

Thus, when the SOAP server (13) receives the SOAP message through link interface it communicates the message to the SLEE provider (18). In accordance with this embodiment of the invention, The SLEE provider (18) determines the service name and the method that should be invoked in the SLEE, using the SOAP message and a map database (not shown in FIG. 1), whose structure is according to any known per se manner.

The provider also parses the method parameters from the SOAP message to, e.g. real Java objects.

Using all this data, the SLEE provider (18) creates a new SLEE event that is to be fired to the SLEE engine (20) using a SLEE dispatcher (constituting another link interface vis-a-vis the SLEE node) that forms part of the SLEE provider. Note that the invention is not bound by any specific link interface between the SOAP machine and the client/SLEE nodes.

After constructing the event, the SLEE provider decides in which InteractionContext the event should be released. The provider saves the information about the Interaction-Context ID in the SOAP appropriate context. By this embodiment, for every new InteractionContext the SOAP makes a new unique ID. The SOAP message is then sent through the link interface via a socket (22) to the SLEE. The SLEE connector (21) in the SLEE listens to a specific port and waits for events. When an event arrives, it is submitted inside the appropriate InteractionContext to the requested service, in accordance with the manner of operation known per se of the SLEE.

The SLEE provides a framework for hosting services. A service is managed through a well-defined life cycle. The SLEE service runs in a context. The context actually defines the scope of the service as it is mentioned in the SOAP service. If a new context is made for each service request (event), then a new instance of the service is made each time. If two service requests (events) are fired to the same context, then they are fired in the same scope of service. Service instances in the SLEE are event driven. The service is called to process events in which the service has declared an interest. Events are represented by the SleeEvent object. The dispatcher receives all events and passes them to service instances that have registered to receive the event.

The SLEE service executes an internal SLEE logic according to the event name, using the event parameters, if any. The execution result (if any) is communicated to the SLEE provider (through socket 23) which will be returned by the SOAP engine (15) as the remote procedure's result. Note that the invention is not bound to any specific form and it may contain one or more values of similar or different types, depending upon the particular application.

The result received by the SOAP Package (12) will be fed and processed by the awaiting client application (11).

The service knows to which associated logic the event is aimed by mapping between the name of the event and the name of the associated logic.

Note that the execution in the SLEE may be transparent insofar as the Client application (11) and/or the SOAP Package module (12) are concerned. Thus, the client application may invoke a procedure, being unaware of the fact that the execution of the procedure is forwarded for remote execution by the SOAP package module (12). The latter, in its turn, may be unaware that the remote procedure is mapped to one or more events triggering one or more services at the SLEE. Thus, the client application, when receiving the procedure result, may be unaware that it was delivered by a remote SLEE service (or services). The net effect is that the client and the SOAP can benefit from the inherent advantages of the execution environment of the SLEE, whilst obviating the need to modify their structure or normal mode of operation.

Those versed in the art will readily appreciate that the invention is by no means bound by the system architecture of FIG. 1. For example, whereas in FIG. 1 the SOAP machine and the SLEE node are constructed as distinct units, they can be implemented within the same node. By way of another non-limiting modified embodiment, the implementation of SLEE provider and SLEE connector modules is broken-down to a different configuration of modules.

In order to enable a client application (e.g. 11 in FIG. 1) that makes an HTTP connection to the SOAP server (e.g. 13 in FIG. 1) to invoke services in the SLEE node (e.g. SLEE server 19 in FIG. 1), a mapping between the SOAP and SLEE primitives is required. By the embodiment of FIG. 1, the SLEE provider (18) utilizes the mapping, using database that stores the appropriate data. The invention is not bound by any particular database implementation.

There now follows one embodiment of mapping between SOAP and SLEE primitives, as follows:

Mapping an object oriented class in the SOAP to a SLEE service. This mapping allows an object to define SLEE services in a natural way. According to this embodiment an object can initiate, load and introspect a SLEE service as a regular class.

Mapping a method (of an object) to a SLEE service event. This mapping enables, inter alia, a regular object to use a SLEE service in a natural way, as it uses any other object.

By a more specific embodiment, the following mapping is provided between the SOAP call parameters and SLEE objects (i.e. a more specific example of mapping between SOAP and SLEE primitives):

The Unified Resource Name (URN) in the SOAP is mapped to a service name in the SLEE.

The method name in the SOAP is mapped to an event name in the SLEE and the SLEE service invoke an internal SLEE logic according to the event name, using the event parameters, if any. The method arguments in the SOAP are mapped to the specified event parameters which, in turn, are contained in the SLEE event (the latter, as recalled, is used by the services instance to identify the internal SLEE logic for execution).

The SOAP attachment (if exists) will be contained in the SLEE event as a byte array to be retrieved by the services method.

Note that arguments and/or attachment are referred to occasionally also as parameters.

The scope of the SOAP service will be mapped to an InteractionContext.

The SOAP Response value (constituting by this example a result) will be mapped to the service's return value (if such exists).

By this specific example, the method arguments and the return value objects will be passed inside the SOAP envelope by the XMI standard. Note that the XMI (XML Metadata Interchange) is a standard for mapping objects to XML.

Figure 2:
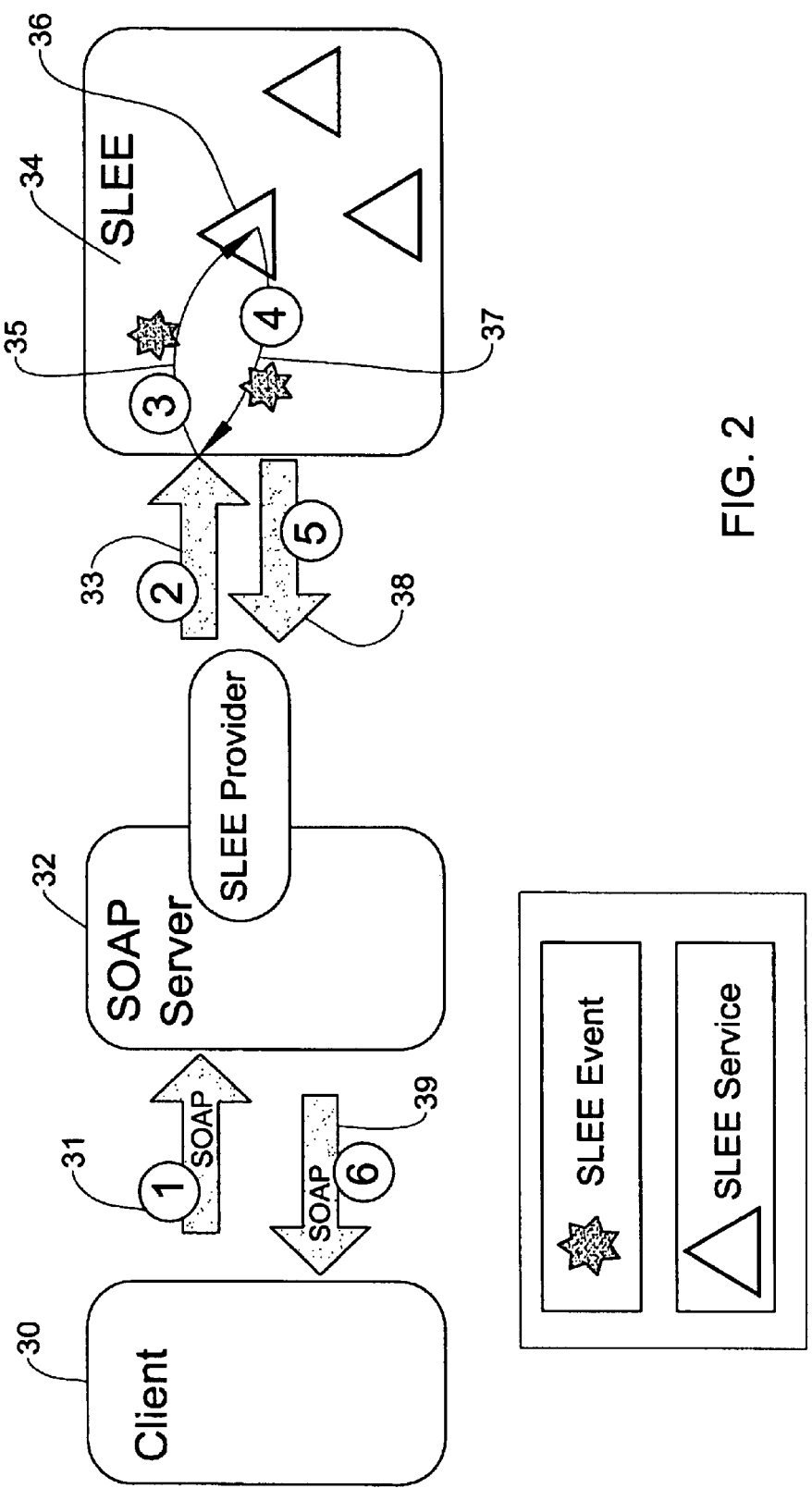
FIG. 2 illustrates a flow diagram of a specific operational scenario, in accordance with an embodiment of the invention.

For a better understanding of the foregoing, attention is drawn to FIG. 2 illustrating a flow diagram of a specific operational scenario, in accordance with an embodiment of the invention.

For the purpose of the example of FIG. 2, assume the following:

There is a service in the SLEE named Actor. The Actor service may have several service instances in the SLEE. One of the events that the Actor service acts on is an event named myAction.

The actor uses a parameter object that is stored in the myAction event.

When the Actor finishes, it may fire an event that contains a value object.

Bearing this in mind, the operational scenario proceeds as follows:

The client node (30) runs a code segment that invokes a SOAP request stating Actor as the class name, myAction as the method name and myParameter as the parameter object. This code segment expects the SOAP server to run the myAction method on an instance of the Actor class ("act" object) using the parameter object as a parameter to the method.

The SOAP request is sent to the SOAP server (32) In the SOAP server, the message is routed to the SLEE provider (33). The SLEE provider creates a SLEE event named myAction, taken from the method name. Put differently, the method name myAction is mapped to an event name myAction.

The myParameter parameter is inserted into the SLEE event and constitutes an event parameter. Then a new SLEE service instance (act) of the type Actor is instantiated. The service instant act corresponds to the class instant act.

Then, the myAction SLEE event is fired on the new Actor service that runs in the SLEE node (e.g. transmitted through socket (33). In the SLEE server (34), a SLEE event named myAction (35) is fired on an Actor service instance act. Note that by this embodiment the so fired event (33) is routed by the SLEE connector (21 in FIG. 1) giving rise to event (35) that is fired on the Actor service instance. By way of another embodiment the so mapped entities may be transmitted to the SLEE service (not necessarily as a fired event) and in this case the SLEE connector will construct the event (35 in FIG. 2) that is fired on the service instance.

The service instant act (36) invokes, in a known per se manner, an internal SLEE logic that is identified by the event name. The logic is executed using the parameters myParameter that are contained in by event (35). When it terminates execution it delivers an output value, insert it into the received event and notifies the SLEE Connector (37) that value is ready to be read from the event.

The value object is sent back (38) to the SLEE provider. The provider makes a SOAP request that responds to the initiator SOAP message. The value object is inserted into the SOAP message. The SOAP message is returned to the client (39) and the client extracts the value from the SOAP message and returns it as the myAction method return value. Note that in this embodiment of mapping between SOAP and SLEE primitives, identical names were used. This, of course, is not obligatory and accordingly mapping of different names is applicable, depending upon the particular application.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various modifications and alterations may be carried out, without departing from the scope of the following claims.

What is claimed is:

1. A method for facilitating execution of a remote method, that is originated from a Remote Procedure Call system, in an Event Driven Execution Environment system, comprising:
   a. receiving from a Remote Procedure Call system a message expressed in Remote Procedure Call system primitives;
   b. mapping Remote Procedure Call system primitives of the message to Event Driven Execution Environment system primitives;
   c. transmitting primitives of the mapped message to the Event Driven Execution Environment system for execution;
   d. receiving a result of the execution from the Event Driven Execution Environment system;
   e. transmitting the result to the Remote Procedure Call system.

2. The method according to claim 1, wherein said Remote Procedure Call system includes a Simple Object Access Protocol (SOAP) system and said (i) includes receiving said message expressed in SOAP primitives; the Event Driven Execution Environment system includes a Service Logic Execution Environment (SLEE) system and said (ii) includes mapping the message to SLEE primitives.

3. The method according to claim 2, wherein said SOAP primitives include class, method and method parameters and wherein said SLEE primitives include service, service instant, event and event parameters, and wherein said (ii) includes:

a. mapping a class to a service;
   b. mapping a method to an event;
   c. mapping method parameters to event parameters;
   d. generating service instance.

4. A method for execution of a remote method, that is originated from a Simple Object Access Protocol (SOAP) system, in a Service Logic Execution Environment (SLEE) system, comprising:
   a. invoking a computer code portion for applying a method with method parameters on the class instant to give rise to a result; the class, method and method parameters form part of SOAP primitives;
   b. transmitting SOAP message that includes the SOAP primitives through the WEB;
   c. receiving and mapping SOAP primitives in the message to SLEE primitives, including:
      mapping a class to a service;
      generating a service instance;
      mapping a method to an event;
      mapping method parameters to event parameters;
   d. firing the event for processing by the service instant that is executed in the SLEE;
   e. executing a logic associated with the service instant using the event parameters and delivering a result;
   f. inserting the result into the event such that the result is ready to be read from the event.
   g. transmitting the result as a reply to the SOAP message; and
   h. extracting the result from the SOAP message.

5. An apparatus for facilitating execution of a remote method, that is originated from a Remote Procedure Call system, in an Event Driven Execution Environment system, comprising:
   a processor and a first link interface configured to receive from a Remote Procedure Call system a message expressed in Remote Procedure Call system primitives;
   the processor and associated database are configured to map the message to Event Driven Execution Environment system primitives;
   the processor and a second link interface configured to transmit primitives of the mapped message to the Event Driven Execution Environment system for execution;
   the processor and the second link interface are configured to receive a result of the execution from the Event Driven Execution Environment system;
   the processor and the first link are configured to transmit the result to the Remote Procedure Call system.

6. The apparatus according to claim 5, wherein said Remote Procedure Call system includes a Simple Object Access Protocol (SOAP) system;
   said processor and first link are configured to receive said message expressed in SOAP primitives;
   the Event Driven Execution Environment system includes a Service Logic Execution Environment (SLEE) system;
   said processor and associated database are configured to map the message to SLEE primitives.

7. The apparatus according to claim 6, wherein said SOAP primitives include class, method and method parameters and wherein said SLEE primitives include service, service instant, event and event parameters, and wherein said processor and database are configured to map at least the following:

a. class to a service;

b. a method to an event;

c. method parameters to event parameters.

8. A program storage device readable by machine, tangibly embodying a program of instructions executable by the machine to perform method steps for facilitating execution of a remote method, that is originated from a Remote Procedure Call system, in an Event Driven Execution Environment system, comprising:

a. receiving from a Remote Procedure Call system a message expressed in Remote Procedure Call system primitives;

b. mapping Remote Procedure Call system primitives of the message to Event Driven Execution Environment system primitives;

c. transmitting primitives of the mapped message to the Event Driven Execution Environment system for execution;

d. receiving a result of the execution from the Event Driven Execution Environment system;

e. transmitting the result to the Remote Procedure Call system.

9. A computer program product comprising a computer useable medium having computer readable program code embodied therein for facilitating execution of a computer program product, comprising:

computer readable program code for causing the computer to receive from a Remote Procedure Call system a message expressed in Remote Procedure Call system primitives;

computer readable program code for causing the computer to mapping Remote Procedure Call system primitives of the message to Event Driven Execution Environment system primitives;

computer readable program code for causing the computer to transmitting primitives of the mapped message to the Event Driven Execution Environment system for execution;

computer readable program code for causing the computer to receiving a result of the execution from the Event Driven Execution Environment system;

computer readable program code for causing the computer to transmit the result to the Remote Procedure Call system.

* * * * *